(12) United States Patent
Carpenter et al.

(10) Patent No.: US 9,903,737 B2
(45) Date of Patent: Feb. 27, 2018

(54) MULTI-TENANT CUSTOMER PORTAL

(71) Applicant: HONEYWELL INTERNATIONAL INC., Morris Plains, NJ (US)

(72) Inventors: Richard Carpenter, Fuquay Varina, NC (US); Kurt Kikendall, Raleigh, NC (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/183,370

(22) Filed: Jun. 15, 2016

(65) Prior Publication Data
US 2017/0363441 A1    Dec. 21, 2017

(51) Int. Cl.
*G01D 4/00*    (2006.01)
(52) U.S. Cl.
CPC .................................. *G01D 4/002* (2013.01)
(58) Field of Classification Search
CPC ...... G01D 4/002; G06Q 50/06; Y04S 40/128; Y04S 20/46; Y04S 10/60
See application file for complete search history.

(56) References Cited

U.S. PATENT DOCUMENTS

| 8,645,239 | B2 | 2/2014 | Swaminathan et al. | |
| 2013/0120156 | A1* | 5/2013 | Swaminathan | G08C 19/00 340/870.02 |
| 2014/0089155 | A1* | 3/2014 | Laventman | G06Q 10/06 705/35 |
| 2014/0277795 | A1* | 9/2014 | Matsuoka | G06Q 30/0202 700/291 |
| 2016/0072677 | A1 | 3/2016 | Gupta et al. | |

FOREIGN PATENT DOCUMENTS

CA    2593568 A1    1/2009

OTHER PUBLICATIONS

"Energy Tracking Analytics Software Application", Energy Tracking Analytics, © 2005-2015, 4 pages.

* cited by examiner

*Primary Examiner* — Curtis Odom
(74) *Attorney, Agent, or Firm* — Baker & Hostetler LLP

(57) ABSTRACT

An advanced metering infrastructure (AMI) portal system and method for coordinating access to meter data within an AMI data repository. The advanced metering infrastructure (AMI) portal system includes a data repository, a first portal, and a second portal. The data repository is configured to store data related to a plurality of devices within an AMI. The first portal includes a device list. The device list includes a list of at least one of the plurality of devices associated with an organization. The performance portal is configured to retrieve the device list from the first portal, and further configured to request meter kpi data for the at least one of the plurality of devices in the device list from the data repository.

19 Claims, 9 Drawing Sheets

US 9,903,737 B2

MULTI-TENANT CUSTOMER PORTAL

TECHNICAL FIELD

The present invention relates to a metering system and method, and more particularly, to a multi-tenant portal system.

BACKGROUND

Advanced Metering Infrastructure (AMI) refers to a network of systems that measure, collect and analyze energy usage, and interact with advanced devices such as electricity meters, gas meters, and water meters, through various communication media either on request (on-demand), or predefined schedules or pushed autonomously. This infrastructure may include, for example, hardware, software, communications, consumer energy displays and controllers, customer associated systems, Meter Data Management (MDM) software, supplier and network distribution business systems, or other metering network components. The network of systems allows collection and distribution of information to customers, suppliers, utility companies and service providers. This enables these businesses to either participate in, or provide, demand response solutions, products and services.

One way in which utility companies coordinate access to the AMI is to create a new instance for each customer. Each created instance includes a list of devices associated with the customer so that the customer can access the customer's data within the AMI using the instance. However, this increases cost and overhead for utility companies that want to (1) share access to data stored within the AMI with multiple customers and (2) protect data stored within the AMI.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

An aspect of the present disclosure provides a method for coordinating access to meter data for a plurality of metering devices within an advanced metering infrastructure (AMI) system. The meter data is stored in a data repository. In one embodiment, the method comprises associating a portal with an organization; receiving, by the portal, a device list including a list of at least one of the plurality of devices associated with the organization; and requesting, by the portal, meter data for the at least one of the plurality of devices in the device list from the data repository.

Another aspect of the present disclosure provides a portal system. The portal system comprises a data repository, a first portal, and a second portal. The data repository is configured to store data related to a plurality of devices. The second portal is configured to report on key performance indicators (KPIs) for devices belonging to an organization. The device list includes a list of at least one of the plurality of devices associated with an organization and is provided by the first portal. The first portal is configured to request meter data for at least one of the plurality of devices in the device list from the operation center.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DESCRIPTION OF THE INVENTION

Figure 1:
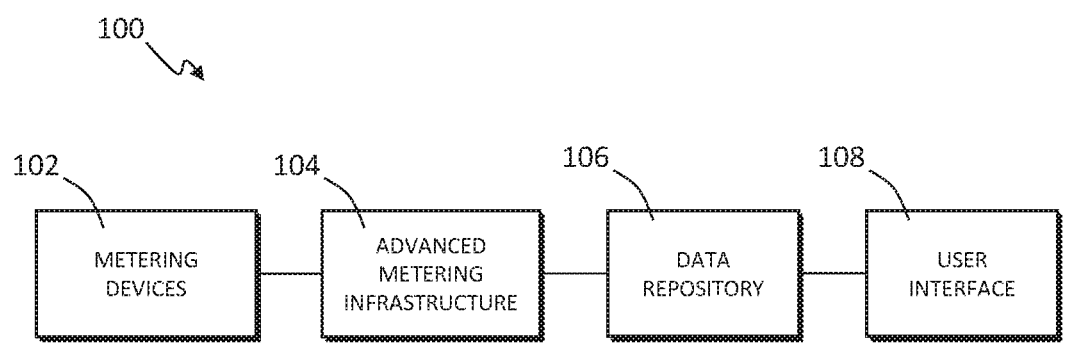
FIG. 1 is a high-level block diagram of a metering system in which the systems, methods, and apparatus disclosed herein may be embodied.

FIG. 1 is a high-level block diagram of a metering system 100, according to an aspect of this disclosure. As shown, the system 100 comprises an advanced metering infrastructure (AMI) 104 interconnected with metering devices 102 through a smart grid, for example. The system 100 allows customers to access data stored in a data repository 106 via a user interface 108. The data stored in the data repository 106 may include, for example, energy usage and billing information on a monthly, daily, or hourly basis. Customers may access data stored in the data repository 106 on a real-time or near real-time basis. The data may be collected by the AMI module 104 from a plurality of metering devices 102 and then transmitted and stored in the data repository 106.

Each of the components that compose the metering system 100 may include hardware, software, communications interfaces, consumer energy displays and controllers, customer associated systems, Meter Data Management (MDM) software, supplier business systems, or the like. The system 100 may be hardware based, software based, or any combination thereof.

Figure 2:
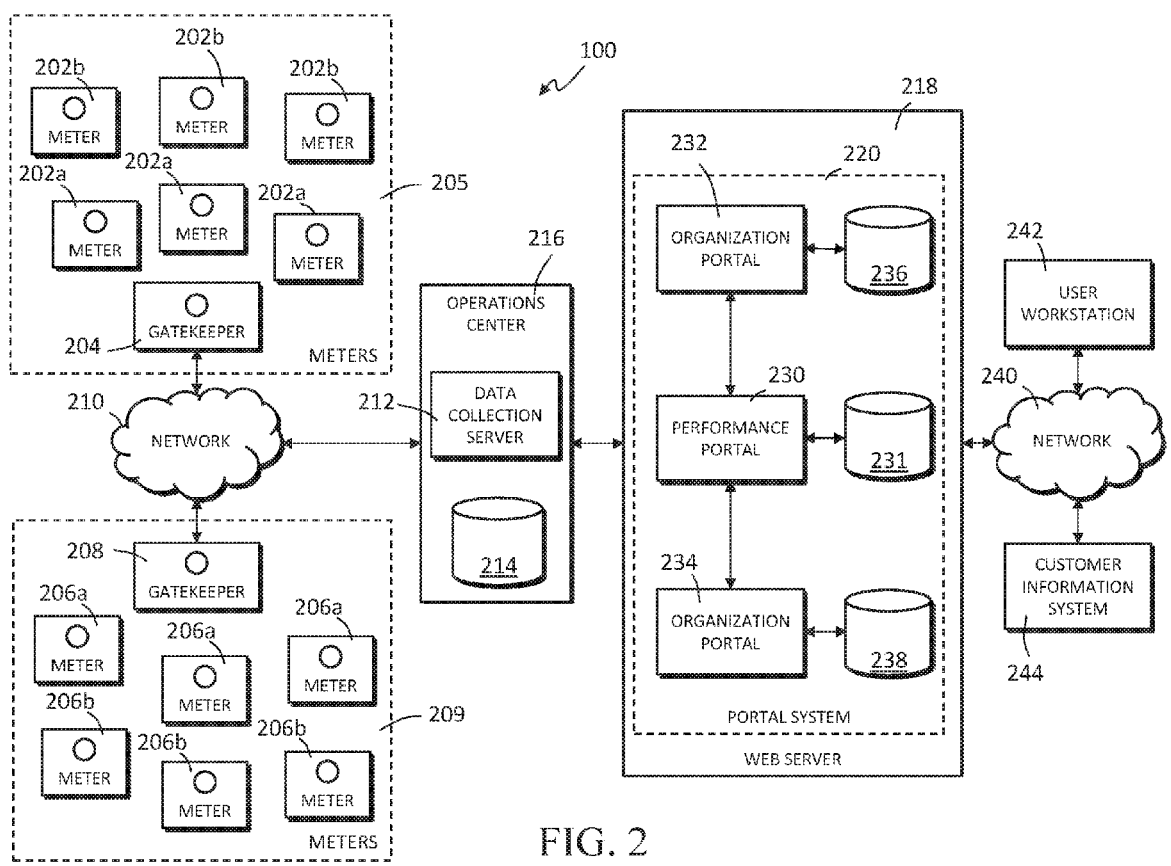
FIG. 2 is a more-detailed block diagram of the metering system of FIG. 1, according to an aspect of the disclosure.

FIG. 2 provides a more detailed block diagram of the metering system 100, according to an aspect of this disclosure. In the embodiment shown, the system 100 comprises a plurality of metering devices, or "meters" 202 and 206, an operations center 216, and a portal system 220. Meters 202 and 206 may be operable to sense and record consumption or usage of a service or commodity such as, for example, electricity, water, or gas. Meters 202 and 208 may be located at customer premises such as, for example, a home or place of business. Meters 202 and 206 comprise circuitry for measuring the consumption of the service or commodity being consumed at their respective locations and for generating data reflecting the consumption, as well as other data related thereto. Meters 202 and 206 may also comprise circuitry for wirelessly transmitting data generated by the meter to a remote location. Meters 202 and 206 may further comprise circuitry for receiving data, commands or instructions wirelessly as well. Meters that are operable to both receive and transmit data may be referred to as "bi-directional" or "two-way" meters (or nodes), while meters that are only capable of transmitting data may be referred to as "transmit-only" or "one-way" meters. In bi-directional meters, the circuitry for transmitting and receiving may comprise a transceiver.

System 100 further comprises gatekeepers 204 and 208. In one embodiment, gatekeeper 204 and 208 are also meters operable to detect and record usage of a service or commodity such as, for example, electricity, water, or gas. In addition, gatekeepers 204 and 208 are operable to send data to and receive data from meters 202 and 206, respectively. Thus, like the meters 202 and 206, the gatekeepers 204 and 208 may comprise both circuitry for measuring the consumption of a service or commodity and for generating data reflecting the consumption and circuitry for transmitting and receiving data. In one embodiment, gatekeepers 204 and 208 and meters 202 and 206 communicate with and amongst one another using any one of several wireless techniques such as, for example, frequency hopping spread spectrum (FHSS) or direct sequence spread spectrum (DSSS). Gatekeepers 204 and 208 may also sometimes be referred to as "collectors" or "routers."

In one embodiment, the gatekeeper 204 and the meters 202 with which it communicates define a first subnet or local area network (LAN) 205, and the gatekeeper 208 and the meters 206 with which it communicates define a second subnet or LAN 209 of the system 100. In one embodiment, each subnet or LAN 205 and 209 may define a controlled, wireless mesh network with the gatekeepers 204 or 208 (collectors) of that LAN effectively controlling the mesh network.

As used herein, the gatekeepers 204 and 208 and the meters 202 and 206 may be referred to as "nodes" in each subnet/LAN 205 and 209. In each subnet/LAN 205 and 209, the meters 202 and 206 transmit data related to consumption of the commodity being metered at the meter's location. The gatekeepers 204 and 208 receive the data transmitted by each meter 202 and 206 in their respective subnet/LAN 205 and 209, effectively "collecting" it, and then periodically transmit the data from all of the meters 202 and 206 in their respective subnet/LAN 205 and 209 to a data collection server 212. The data collection server 212 stores the data for analysis and preparation of bills, for example. The data collection server 212 may be a specially programmed general purpose computing system and may communicate with gatekeepers 204 and 208 via a network 210. The network 210 may comprise any form of network, including a wireless network or a fixed-wire network, such as a local area network (LAN), a wide area network (WAN), the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, a TCP/IP network, a W-WAN, a GPRS network, a CDMA network, a Fiber network, or any combination of the above.

The operations center 216 may be referred to as a utility's "operations center," "head-end," or similar name, and may include an AMI, MDM, customer associated system, or other similar operations center. Typically, the operations center 216 will be operated by a utility company or a company providing information technology services to a utility company. As shown, the operations center 216 may comprise the data collection server 212 and a meter data repository or meter database 214. The operation center 216 may also comprise, for example, a network management server and a network management system (NMS), that together with the data collection server 212 manage one or more subnets/LANs and their constituent nodes. The NMS may track changes in network state, such as new nodes registering/unregistering with the system 100, node communication paths changing, etc. This information is collected for each subnet/LAN and is detected and forwarded to the network management server and data collection server 206.

Each of the meters 202 and 206 and gatekeepers 204 and 208 is assigned an identifier (LAN ID) that uniquely identifies that meter or collector on its subnet/LAN. In this embodiment, communication between nodes (i.e., the collectors and meters) and the operation center 216 is accomplished using the LAN ID. However, it is preferable for operators of a utility to query and communicate with the nodes using their own identifiers. To this end, a marriage file may be used to correlate a utility's identifier for a node (e.g., a utility serial number) with both a manufacturer serial number (i.e., a serial number assigned by the manufacturer of the meter) and the LAN ID for each node in the subnet/LAN. In this manner, the utility can refer to the meters and collectors by the utilities identifier, while the system can employ the LAN ID for the purpose of designating particular meters during system communications.

The data collection server 212 collects meter data from the nodes (e.g., gatekeepers 204 and 208) via the network 210 and stores the data in the meter repository 214. The meter data includes metering information, such as energy consumption, load profile, demand, time of use (TOU), and may be used for billing and other purposes by a utility provider. A utility may request that meter data be collected from particular meters 202/206.

The operations center 216 may also include a device configuration database, a data collection requirements database, a network state database, or still other databases. The device configuration database may store configuration information regarding the nodes, the data collection requirements database may contain information regarding the data to be collected on a per node basis, and the network state database may include the state of the network at a particular point. Reports containing information on the network or database configuration may be automatically generated or in accordance with a utility request.

Access to the data on the web server 218 may be coordinated using the portal system 220. The portal system 220 may be a multi-tenant Platform-as-a-Service (PaaS) product hosted in a cloud computing environment, such as cloud provider system. The term "multi-tenant" refers to a feature of the portal system 220 that hosts multiple different web applications having multiple different organization owners on a virtual machine (VM) in the cloud computing environment. In production, such a multi-tenant portal system may execute utilizing multiple computing devices to provide multiple tiers of the portal system 220, with a variety of inter-related components and protocols. For example, the multiple tiers of the portal system 220 may include a client layer hosting client tools to access the functionality of the portal system 220, a broker layer having multiple broker machines to coordinate and configure initialization of new end user applications, a node layer including nodes (e.g., VM, physical machine, etc.) to host the applications, messaging servers, a data store of a database, a Domain Name Service (DNS) server, or still other tiers.

The portal system 220 may include instances for a performance portal 230, a first organization portal 232, and a second organization portal 234. Each instance of the portal system 220 can be launched on top of any type of hardware resource, from a single laptop to an enterprise-wide data center and may be dynamically configured within the portal system 220. The first organization portal 232 and the second organization portal 234 may be accessed by, for example, a user workstation 242 via a communication network 240. It will be appreciated that the metering system 100 may include multiple user workstations 242 used to access the portal system 220. The network 240 may comprise a public network, such as a public local area network or wide area network, for example the Internet. Alternatively, the network 240 may comprise a private network, such as a private local area or wide area network. The flexibility of such a portal system 220 allows for the addition of multiple customer portals. As used herein, the term "organization" may be a utility, a municipality, a cooperative, or any other organization that provides information regarding at least one metering device under its control.

The first and second organization portals 232 and 234 are each configured to be accessible by a user. For example, when the first organization portal 232 is instantiated, the first organization portal 232 may be associated with an organization (e.g. a first organization). The first organization may include at least one user (e.g. a first user) that may be provided with a unique identification and access code for the portal 232. Therefore, any data being transmitted to and from the first organization portal 232 may only be accessible by the first user. The first user may access the first organization portal 232 by the user workstation 242 via the network 240. The first and second portals 232 and 234 may interface with the operations center 216 via the web server 218. As used herein, the term "user" may refer to utility customers, customer service representatives, commercial industrial customers or any other entities that desire information from the portal system 220.

The first and second portals 232 and 234 may also interface with a customer information system (CIS) 244 associated with a particular organization. The CIS 244 associated with each organization includes organization information data. The organization information data may include, for example, a device list that includes a list of devices associated with locations, a list of locations associated with accounts, a list of accounts associated with utility customers, and a list of utility customers associated with a utility. The organization information data may be input into the portal system 220 via the network 240. A portal system 220 administrator may input the organization information data or the data may be imported dynamically from the CIS 240 via a web service.

The performance portal 230 may interface with the operations center 216 via the web server 218 to access all of the meter metrics stored within the meter database 214. The meter metrics may be stored in a performance database 231. The performance portal 230 may also store in the performance database 231 data related to the meter to organization relationship. The first organization portal 232, the second organization portal 234, and the performance portal 230 may communicate with the operations center 216 or the CIS 244 using, for example, representational state transfer (REST) and MultiSpeak web service calls.

The first and second portals 232 and 234 may be configured to receive the organization information data from the CIS 244. For example, a first organization information data may be associated with the first organization. The CIS 244 may send the first organization information data to the first portal 232. The organization information data for the first organization portal 232 and the organization information data for the second organization portal 234 may be stored in a first organization database 236 and a second organization database 238, respectively. In an aspect, the first and second portals 232 and 234 may be configured to receive the organization information data from the CIS 244 dynamically, such that any updates may be regularly communicated to the portals 232 and 234.

Based on the organization information data stored in the first and second organization portals 232 and 234, the first and second organization portals 232 and 234 may be configured to request meter data from the operations center 216 via the web service 218. Access to the meter data may be limited to the information for the metering devices associated with each portal. For example, if the first organization portal 232 requests meter data, the operations center 216 may only send data associated with the first organization information data. Therefore, the first organization portal 232 would receive meter data related to the list of devices within the first organization information data.

As can be appreciated, the metering system 100 described above allows users to access up-to-date information regarding each metering device under its control. The first and second portals 232 and 234 may receive organization information data from the CIS 244 on a dynamic basis. Therefore, as organization information data changes, each organization portal may access the most up-to-date metering information within the operations center 216.

Figure 3:
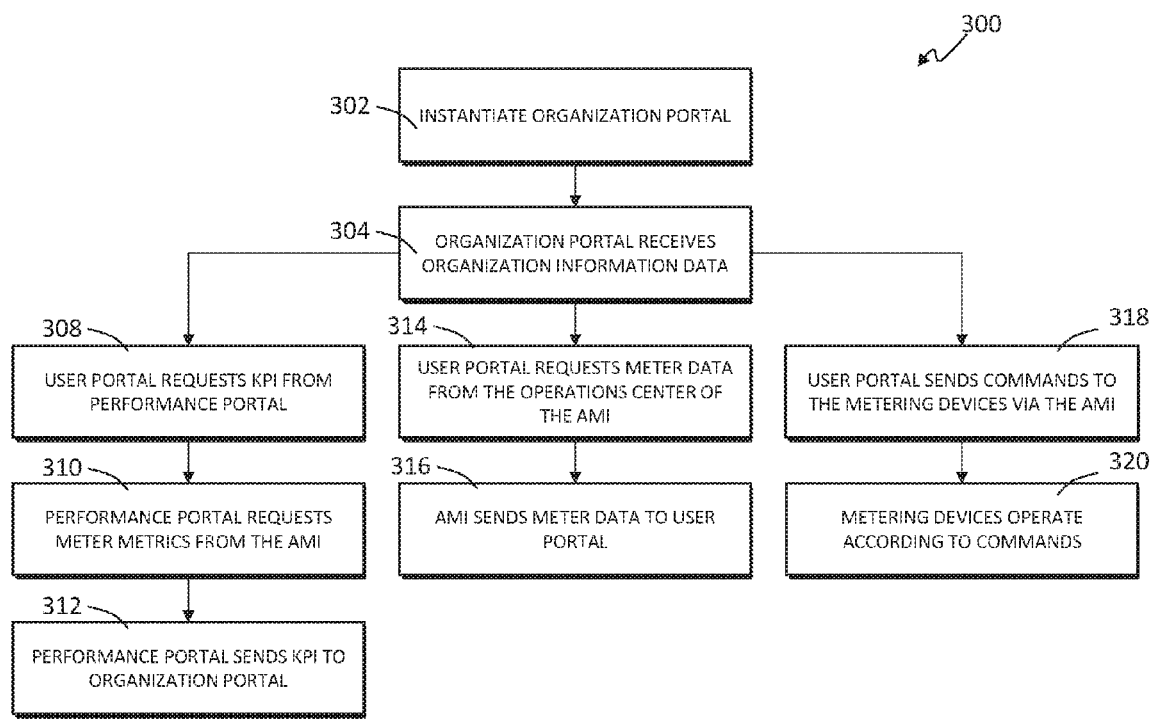
FIG. 3 is a flow diagram of a method for coordinating access to meter data within a metering system, according to an aspect of the disclosure.

FIG. 3 illustrates a flow diagram 300 for operating the metering system 100, according to an aspect of this disclosure. At step 302, an organization portal (e.g. the first organization portal 232) may be instantiated within the portal system 220. During instantiation, the first organization portal 232 may be given a unique identification and access code and may be associated with an organization (e.g. the first organization). The portal system 220 may be configured to include multiple user portals, for example, one for each user that has a metering device 202/206 within the metering system 100. Each portal within the portal system 220 may include similar attributes as each other portal within the portal system 220.

At step 304, the organization portal (e.g. the first organization portal) receives organization information data (e.g. the first organization information data) associated with an organization (e.g. the first organization). The first organization portal 232 may store the organization information data in memory (e.g. first organization database 236). The organization information data may have a device list (e.g. a first device list) that includes a plurality of devices (e.g. each of the devices 202/204 within the first subnet/LAN 205) associated with the organization. Each of the plurality of devices may also be associated with, for example, a location, an account, a customer, and a utility. The organization information data may be received from the CIS 244, or may be input by a portal administrator. The first organization information data may be sent dynamically; therefore, any updates to the first organization information data received from, for example, the CIS 244, may be sent to and received by the first organization portal 232.

The first organization portal 232 may access meter data within the operations center 216 associated with the first device list of the first organization information data. For example, at step 308, the first organization portal 232 may request a key performance indicator (KPI) from the performance portal 230. As used herein, a KPI may include meter data or meter metrics indicative of the performance of a metering device or group of metering devices, and may include, without limitations, energy usage (load profile), bill estimation, meter read performance, meter statistics, devices orphaned from mesh, devices with hardware alarms, reads failing validation, installed device counts (by date), billing cycle performance (by cycle number), device to router loading, data collection run times by gatekeeper/schedule, and meter performance maps. In response to the KPI request, the performance portal 230 may request (310) the meter metrics for each of the devices 202/204 within the first subnet/LAN 205 as indicated by the first device list from the operations center 216. Meter reading statistics may include, for example, the time when the last read type was provide by each device 202/204. At step 312, the performance portal 230 may send the KPI data for each of the devices 202/204 within the first subnet/LAN 205 to the first organization portal 232.

Another example may include the first organization portal 232 sending a request (314) for meter data to the operations center 216. Upon receiving the request, the operations center 216 may send (316) the meter data for each of the devices 202/204 within the first subnet/LAN 205 as indicated by the first device list to the first organization portal 232.

Another example may include the first organization portal 232 sending a command (318) to the operations center 216 to command one or more of the devices 202/204 within the first subnet/LAN 205 as indicated by the first device list. Upon receipt of the command, the operations center 216 may command each of the devices 202/204 within the first subnet/LAN 205 to operate according to the command (320).

Although the flow diagram 300 is described with respect to the first organization portal 232, the flow diagram 300 may also apply to the second organization portal 234 and/or any other organization portal instantiated within the portal system 220.

FIGS. 4A through 4E illustrate examples of graphical user interfaces (GUI) showing KPIs requested by an organization portal from the performance portal 230, according to aspects of this disclosure. Each GUI is an example of how the meter data for each of the plurality of devices within a device list may be displayed within an organization portal. Each KPI may include data on a daily, weekly, or monthly basis.

Figure 4A:
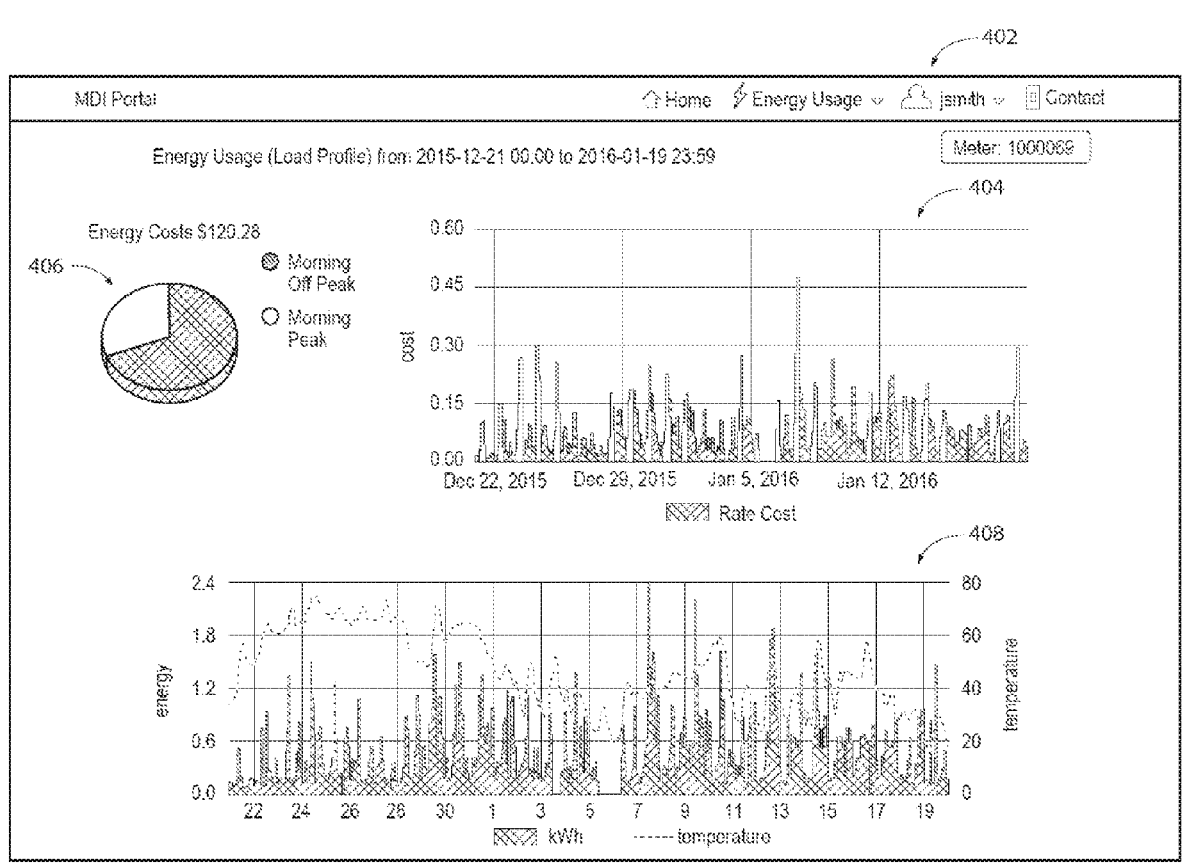
FIGS. 4A-4E illustrate examples of user interfaces for a customer portal system, according to an aspect of the disclosure.

FIG. 4A illustrates a GUI 402 displaying data pertaining to energy usage for a metering device 202/206, in accordance with one embodiment. As shown, the GUI 402 displays a bar chart 404 which displays energy costs over a period of several weeks, a pie chart 406 which displays the energy costs broken down by off-peak and peak, and a bar chart/line chart combination 408 which displays the energy usage (bar) and temperature (line) over the period of several weeks.

Figure 4B:
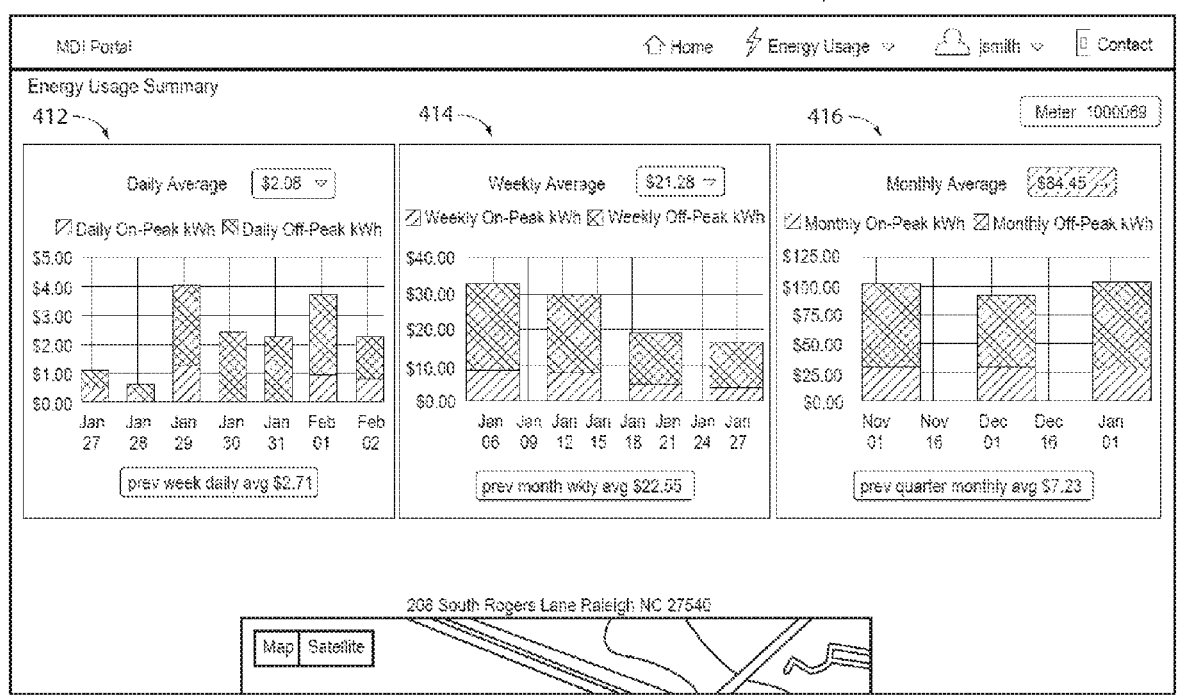

FIG. 4B illustrates a GUI 410 displaying data pertaining to energy usage for a metering device 202/206, in accordance with one embodiment. As shown, the GUI 410 displays a bar chart on a daily (412), weekly (414), and monthly (416) basis for the energy usage. Each bar chart 412/414/416 displays a cost for energy usage broken down by peak and off-peak, and an average cost for energy usage.

Figure 4C:
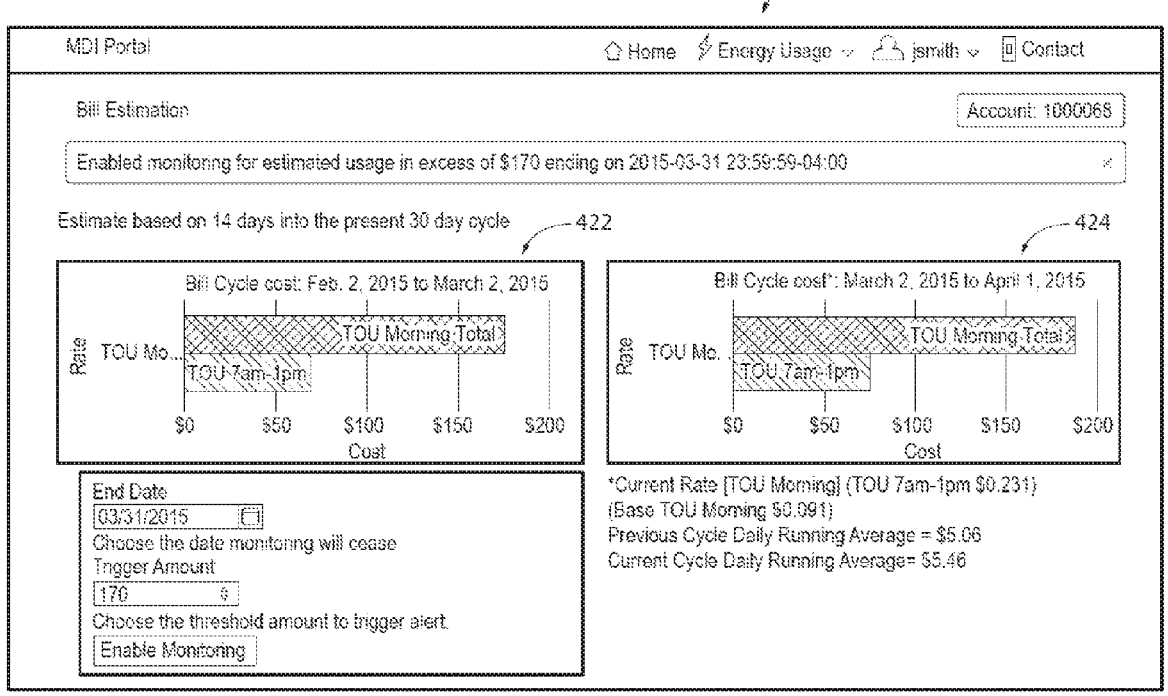

FIG. 4C illustrates a GUI 420 displaying data pertaining to bill estimation for a metering device 202/206, in accordance with one embodiment. As shown, the GUI 420 displays a bar chart for a previous bill cycle (422) and a bar chart for an estimated bill cycle (424). Each bar chart 422/424 is broken down based on TOU. The estimated bill cycle is calculated by, for example, the previous bill cycle daily average and the current bill cycle daily average.

Figure 4D:
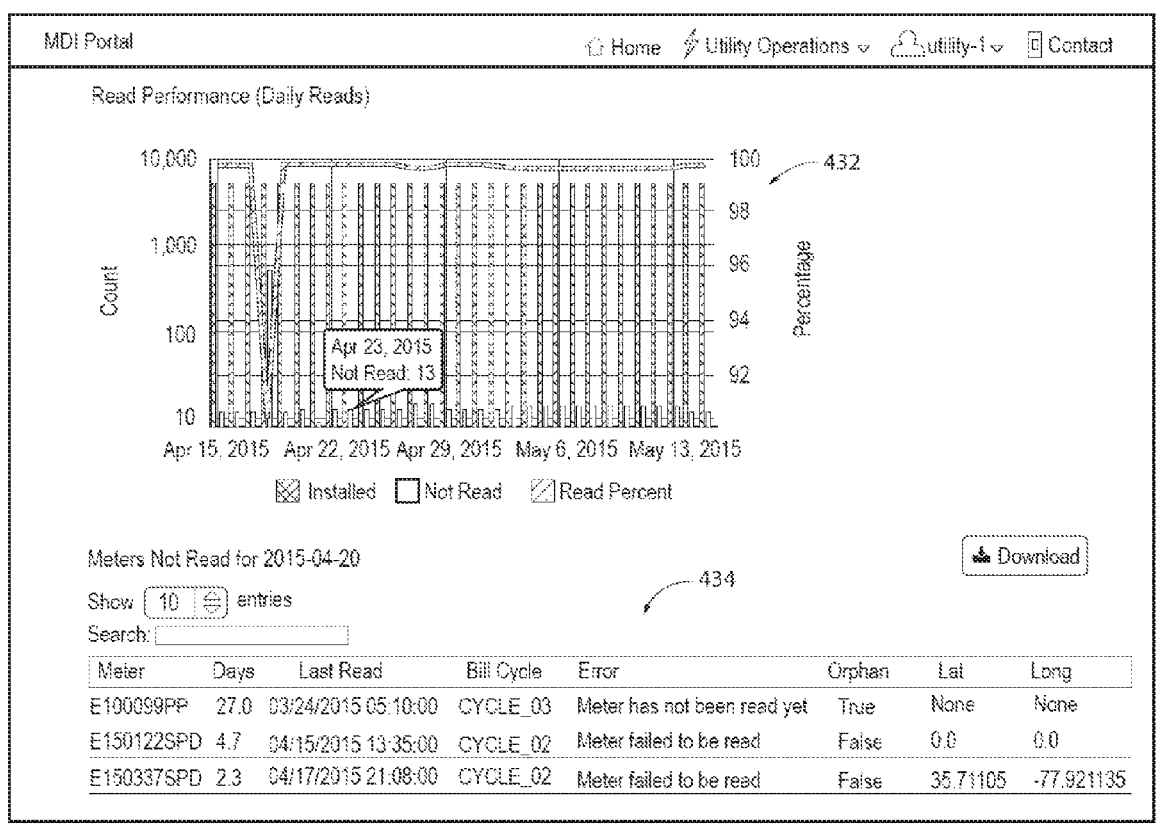

FIG. 4D illustrates a GUI 430 displaying historical read performance for all of the metering devices 202/206 within a device list over time, in accordance with one embodiment. The GUI 430 shows a performance bar chart 432 that includes a count for the number of metering devices 202/206 installed, a count of metering devices 202/206 not read, and a percentage of metering devices 202/206 not read. The GUI 430 also shows a performance table 434 that lists each of the metering devices 202/206 that were not read.

Figure 4E:
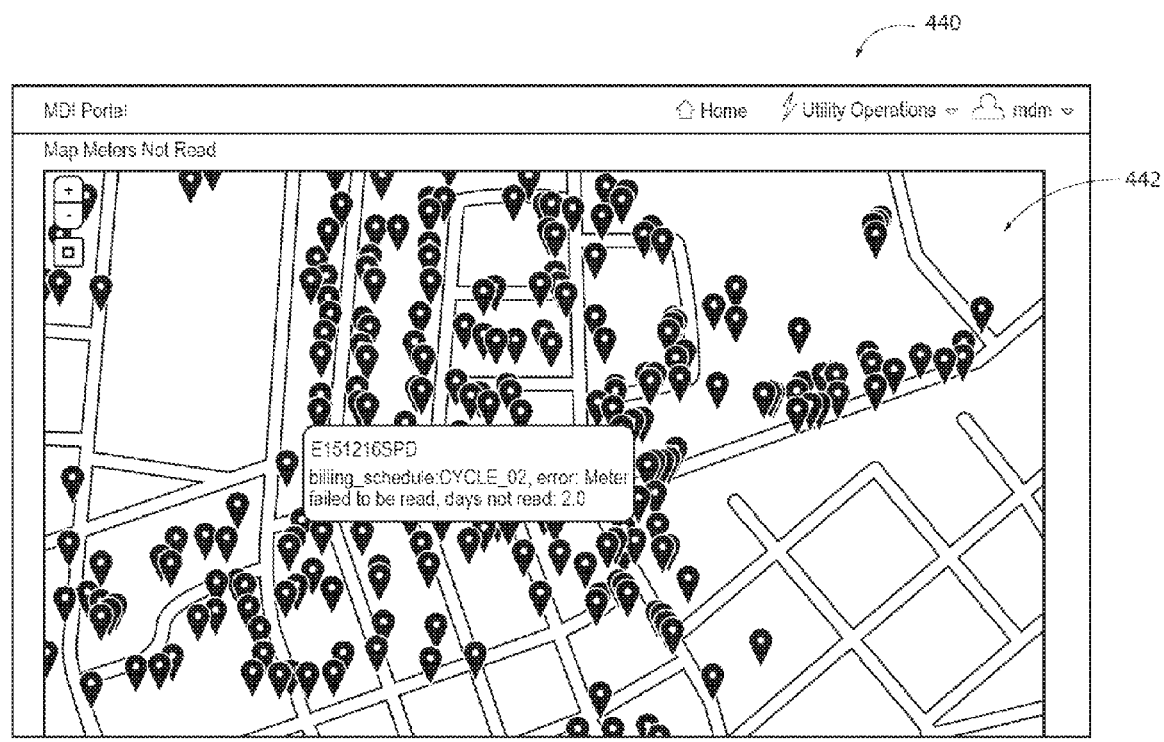

FIG. 4E illustrates a GUI 440 that displays a map 442 displaying the locations of each of the metering devices 202/206 within a device list, in accordance with one embodiment. In particular, the map 442 indicates which meters 202/206 have been successfully read and which meters 202/206 have failed to read or non-performing meters.

Figure 5:
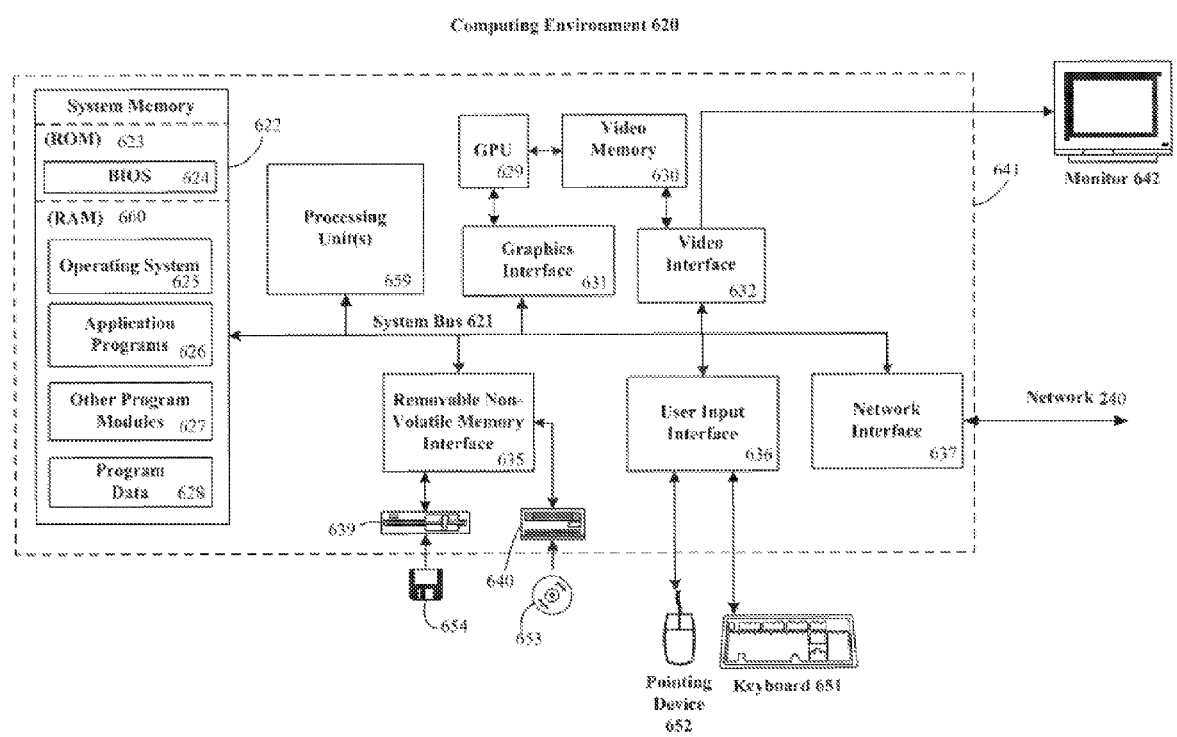
FIG. 5 is a block diagram of an example computing environment that may be used to implement aspects of the metering system illustrated in FIGS. 1 and 2, according to an aspect of this disclosure.

FIG. 5 is an example embodiment of a computing environment 620 of which various aspects of the metering system 100 could be implemented. For example, the computing environment 620 may be used to implement the web server 218 (and associated functionality of FIGS. 3 and 4A-E), data collection server 216, and/or workstation 242, or any other aspect of the disclosed system that requires computing. The computing environment 620 is only one example of a suitable computing environment and is not intended to suggest any limitation as to the scope of use or functionality of the presently disclosed subject matter. Neither should the computing environment 620 be interpreted as having any dependency or requirement relating to any one or combination of components illustrated in FIG. 5. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since the state of the art has evolved to a point where there is little difference between hardware, software, or a combination of hardware/software, the selection of hardware versus software to effectuate specific functions is a design choice left to an implementer. More specifically, a software process can be transformed into an equivalent hardware structure, and a hardware structure can itself be transformed into an equivalent software process. Thus, the selection of a hardware implementation versus a software implementation is one of design choice and left to the implementer.

In FIG. 5, the computing environment 620 comprises a computer 641. The computer 641 comprises a processing unit(s) 659, which may comprise a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processing unit(s) 659 may perform signal coding, data processing, power control, input/output processing, and/or any other functionality that enables the computing environment 620 to operate in accordance with its intended functionality. The computer 641 may further comprise a graphics interface, graphics processing unit (GPU), video memory 630, and video interface. These components may cooperate to display graphics and text on a video monitor, such as monitor 642. For example, the graphical user interfaces illustrated in FIGS. 4A-4E may be displayed by these components on monitor 642. Processing unit(s) 659 and GPU 629 may receive, generate, and process data related to the methods and apparatuses disclosed herein.

In operation, processing unit(s) 659 fetches, decodes, and executes instructions, and transfers information to and from other resources via the computer's main data-transfer path, system bus 621. Such a system bus connects the components in computer 641 and defines the medium for data exchange. System bus 621 typically includes data lines for sending data, address lines for sending addresses, and control lines for sending interrupts and for operating the system bus. An example of such a system bus 621 is the PCI (Peripheral Component Interconnect) bus. A system memory 622 includes computer storage media in the form of volatile and/or nonvolatile memory such as read only memory (ROM) 623 and random access memory (RAM) 660. A basic input/output system 624 (BIOS), containing the basic routines that help to transfer information between elements within computer 641, such as during start-up, is typically stored in ROM 623. RAM 660 typically contains data and/or program modules that are immediately accessible to and/or presently being operated on by processing unit 659. By way of example, and not limitation, FIG. 5 illustrates operating system 625, application programs 626, other program modules 627, and program data 628.

The computer 641 may also include other removable/non-removable, volatile/nonvolatile computer storage media. By way of example only, the computer 641 may include a hard disk drive (not shown) that reads from or writes to non-removable, nonvolatile magnetic media, a magnetic disk drive 639 that reads from or writes to a removable, non-volatile magnetic disk 654, and an optical disk drive 640 that reads from or writes to a removable, nonvolatile optical disk 653 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Magnetic disk drive 639 and optical disk drive 640 are typically connected to the system bus 621 by a removable memory interface, such as interface 635. The drives and their associated computer storage media discussed above and illustrated in FIG. 5, provide storage of computer readable instructions, data structures, program modules and other data for the computer 641.

A user may enter commands and information into the computer 641 through input devices such as a keyboard 651 and pointing device 652, commonly referred to as a mouse, trackball or touch pad. Other input devices (not shown) may include a microphone, joystick, game pad, satellite dish, scanner, or the like. These and other input devices are often connected to the processing unit 659 through a user input interface 636 that is coupled to the system bus, but may be connected by other interface and bus structures, such as a parallel port, game port or a universal serial bus (USB). The computer may connect to a local area network or wide area network, such as network 240, through a network interface or adapter 637.

Thus, it is understood that any or all of the apparatuses, systems, methods and processes described herein may be embodied in the form of computer executable instructions (i.e., program code) stored on a computer-readable storage medium which instructions, when executed by a processor, such as processing unit(s) 659, cause the processor to perform and/or implement the systems, methods and processes described herein. Specifically, any of the steps, operations or functions described herein may be implemented in the form of such computer executable instructions, executing on the processor of a computing system or other computing apparatus. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A method for coordinating access to meter data for a plurality of metering devices within a metering system, wherein the plurality of metering devices are connected to and communicate via a communications network, the meter data being stored in a data repository, the method comprising:
    associating, within the data repository, a first portal with an organization;
    receiving, by the first portal via a user interface, a device list including a list of at least one of the plurality of devices, each of the at least one of the plurality of devices being associated with the organization;
    requesting, by the first portal in response to a request received via a user interface of the portal, meter data from the data repository for the at least one of the plurality of devices in the device list;
    requesting, by the first portal, a key performance indicator (KPI) from a performance portal, wherein the performance portal accesses the KPI for the at least one of the plurality of devices in the device list from the data repository; and
    receiving, by the first portal, the KPI from the performance portal.

2. The method of claim 1, wherein the performance portal receives the device list from the first portal.

3. The method of claim 1, further comprising:
    associating, within the data repository, at least one of the plurality of devices with the organization.

4. The method of claim 1, further comprising:
    sending, by the portal, a command to at least one of the plurality of devices in the device list.

5. The method of claim 1, wherein the portal receives the device list from a customer information system.

6. The method of claim 1, wherein the first portal and the performance portal are hosted by a Platform-as-a-Service system.

7. The method of claim 1, wherein the device list further includes a plurality of locations, wherein each of the plurality of devices is associated with one of the plurality of locations.

8. The method of claim 6, wherein the device list further includes a plurality of accounts, wherein each of the plurality of locations is associated with one of the plurality of accounts.

9. The method of claim 8, wherein the device list further includes a plurality of customers, wherein each of the plurality of accounts is associated with one of the plurality of customers.

10. The method of claim 9, wherein the device list further includes a plurality of utilities, wherein each of the plurality of customers is associated with one of the plurality of utilities.

11. A portal system for accessing meter data for a plurality of devices within an operations center, the meter data being stored within a data repository, the system comprising:
a performance portal; and
a first portal comprising a device list, the device list including a list of at least one of the plurality of devices, each of the at least one of the plurality of devices being associated with an organization, the first portal configured to request a key performance indicator (KPI) from the performance portal,
wherein the performance portal is configured to (i) receive the request for the key performance indicator (KPI) from the first portal, (ii) access the KPI associated with the at least one of the plurality of devices stored in the data repository, and (iii) send the KPI to the first portal.

12. The system of claim 11, wherein the performance portal is configured to access the KPI stored in the data repository via a web service.

13. The system of claim 12, wherein the first portal is configured to request the meter data from the data repository via the web service.

14. The system of claim 11, wherein the first portal and the performance portal are hosted by a Platform-as-a-Service system.

15. A metering system comprising:
a plurality of metering devices;
a data repository configured to store data related to the plurality of metering devices; and
a portal system comprising:
a performance portal; and
a first portal comprising a device list, the device list including a list of at least one of the plurality of devices, each of the at least one of the plurality of devices being associated with an organization, the first portal configured to request a key performance indicator (KPI) from the performance portal,
wherein the performance portal is configured to request the KPI for the at least one of the plurality of devices in the device list from the data repository, and further configured to send the KPI to the first portal.

16. The metering system of claim 15, wherein the first portal is configured to receive the device list from a customer information system.

17. The metering system of claim 15, wherein the device list further includes a plurality of locations, wherein each of the plurality of devices is associated with one of the plurality of locations.

18. The metering system of claim 17, wherein the device list further includes a plurality of accounts, wherein each of the plurality of locations is associated with one of the plurality of accounts.

19. The metering system of claim 18, wherein the device list further includes a plurality of customers, wherein each of the plurality of accounts is associated with one of the plurality of customers, and wherein the device list further includes a plurality of utilities, wherein each of the plurality of customers is associated with one of the plurality of utilities.

* * * * *